United States Patent [19]

Mattia

[11] 4,231,764
[45] Nov. 4, 1980

[54] SYSTEM FOR REMOVING ORGANIC CONTAMINANTS FROM AIR

[76] Inventor: Manlio M. Mattia, 1208 Waterford Rd., West Chester, Pa. 19380

[21] Appl. No.: 945,327

[22] Filed: Sep. 25, 1978

[51] Int. Cl.³ ............................................. B01D 53/08
[52] U.S. Cl. .............................................. 55/28; 55/60; 55/62; 55/79
[58] Field of Search ............ 55/34, 60, 62, 74, 77–79, 55/181, 387, 390, 28

[56] References Cited

U.S. PATENT DOCUMENTS

| | | | |
|---|---|---|---|
| 1,836,301 | 12/1931 | Bechthold | 55/79 X |
| 2,545,067 | 3/1951 | Berg et al. | 55/79 X |
| 2,616,515 | 11/1952 | Berg | 55/79 X |
| 2,616,521 | 11/1952 | Berg | 55/79 X |
| 2,630,877 | 3/1953 | Berg | 55/79 X |
| 3,264,801 | 8/1966 | Buhl et al. | 55/79 X |
| 3,455,089 | 7/1969 | Mattia | 55/62 |
| 3,520,112 | 7/1970 | Mittelstrass et al. | 55/390 X |
| 3,534,529 | 10/1970 | Mattia | 55/62 |
| 3,902,874 | 9/1975 | McAndrew | 55/387 X |

*Primary Examiner*—Robert H. Spitzer
*Attorney, Agent, or Firm*—John B. Sowell

[57] ABSTRACT

A process for removing organic contaminants from the air or gases by means of a continuous fluidized bed adsorption system wherein the adsorbent material is treated in four continuous stages. In stage one the contaminants are deposited on the adsorbent material. In stages two and three the high and lower volatile contaminants are stripped from the adsorbent material. In stage four the adsorbent material is cooled for return to stage one. Each stage is controllable independently of the other stages so that recovery of contaminants from stages two and/or three are independent of the amount of contaminants recovered or the amount of contaminants which are incinerated for use in stages two to four.

13 Claims, 1 Drawing Figure

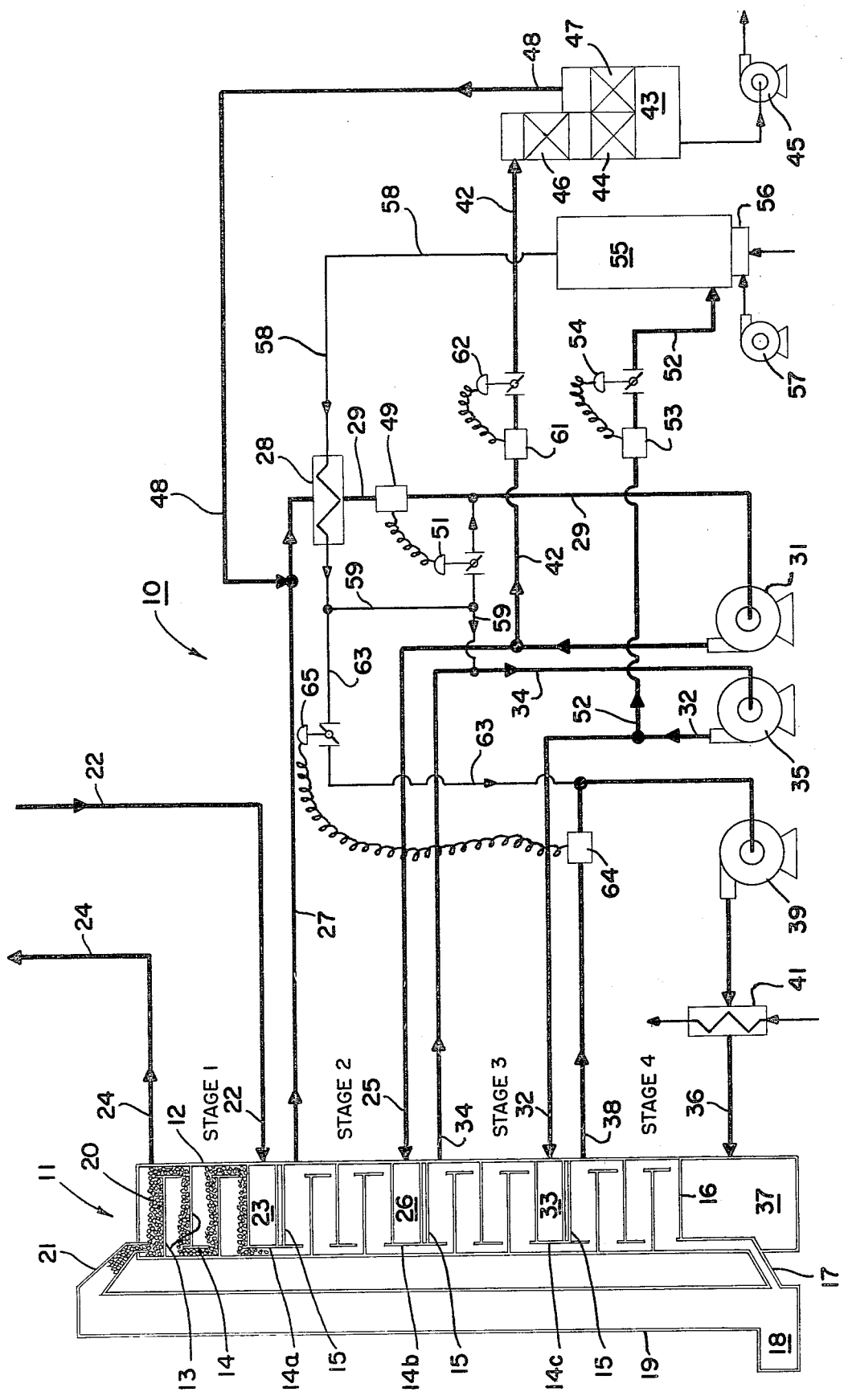

SYSTEM FOR REMOVING ORGANIC CONTAMINANTS FROM AIR

BACKGROUND OF THE INVENTION

1. Field of the Invention

The present invention relates to a process and apparatus for reclaiming organic contaminants from gases. More particularly, the process is adapted to economically recover valuable organic materials from contaminated air and to return purified air to the environment or to a process area.

2. Description of the Prior Art

Heretofore, processes for the recovery and/or safe disposal of organic contaminants in gases were known.

Organic contaminants have been deposited on adsorbent materials which have been stripped or regenerated by steam. It is known that the process of steam regeneration is not efficient for low concentrations of organic contaminants nor is the process energy efficient.

Organic contaminants have been deposited on adsorbent materials which have been stripped or regenerated in a partial vacuum. A partial vacuum enhances the evaporation effect and the stripping action. It is known that this vacuum process is limited to fixed bed adsorbers which require cyclical operation. A vacuum alone is insufficient to strip or remove high boiling point contaminants. Further, it is known that the evaporation effect absorbs heat, accordingly, additional energy is required for heating gases in a vacuum regeneration process.

Hot gases have been employed to strip contaminants from adsorbent materials. In my U.S. Pat. No. 3,455,089 there is shown a process for periodically regenerating contaminant bearing adsorbent materials. A feature of this patent teaches that the stripped contaminants may be incinerated to produce the energy to heat the hot regenerating gases by directly mixing or indirectly heat exchanging. It is known that direct mixing of the incinerated contaminants may provide a partially inert regenerating gas.

In my U.S. Pat. No. 3,534,529 there is shown a cascade process for periodically regenerating contaminant bearing adsorbent materials with hot gases. A feature of this patent teaches that the stripped contaminants may be removed and recovered in a secondary adsorber and then stripped with steam which can be condensed to provide a mixture of water and the stripped contaminants. This recovery system requires decanting of the recovered liquid mixture or fractionation as the case may be.

While the teachings of U.S. Pat. Nos. 3,455,089 and 3,534,529 suggest that the incineration of the contaminants would leave nothing for recovery, any attempt to achieve a partial incineration of the contaminants would be self-defeating. There would be an incomplete combustion of the contaminants which would result in destruction of the formerly recoverable contaminants and also atmospheric pollution of the exhaust.

If a compromise is attempted and a portion of the recoverable contaminants is incinerated the major portion of the capital equipment of both aforementioned patents is still required.

It is conservatively estimated that a large automotive assembly plant which exhausts one million cubic feet of air per minute from its solvent contaminated assembly and painting areas discharges in excess of 8,000 gallons of solvent per eight hour shift. It would require 11,400 cubic feet of natural gas per minute to incinerate this solvent in the contaminated air even if you allow for a sixty percent recovery of the heat from the incinerator.

Heretofore, it was not economically feasible to justify the capital equipment cost of a contaminant recover system due to the high capital cost and low efficiency of the system.

The present invention, organic contaminant recovery system, is capable of paying for its capital cost in less than ten years based on the recovery of 4,000 gallons per day or fifty percent of the usual paint solvent employed by automotive assembly plants.

It would be desirable to be able to recover a complete range of low to high boiling point organic contaminants from gases in either a low or high concentration using the same process and apparatus. Further, it would be desirable to provide an apparatus and system which is more efficient than prior art processes and is cheaper than apparatus known in the prior art.

SUMMARY OF THE INVENTION

The primary object of the present invention is to provide a more efficient organic contaminant recovery system.

Another primary object of the present invention is to provide a novel contaminant recovery system which will pay for itself in the saving obtained by the recovery of medium price range organic solvents used in painting.

It is another object of the present invention to provide a novel continuously operable contaminant recovery system which is operable in a safe steady state.

It is another object of the present invention to provide a novel contaminant recovery system which is operable to isolate and recover the most valuable fraction of a blend of organic contaminant solvents.

It is another object of the present invention to provide a novel contaminant recovery process in which the stages of the process are not interdependent and are independently controllable by simple and cheap self-contained dynamic controls.

These and other objects of the present invention are achieved by providing an adsorption tower having a continuously moving fluidized recirculating bed of adsorbent material. The adsorbent material is treated in four continuous stages wherein a first circulating loop of vapor contaminant laden gas is passed through the adsorbent material to clean said gas and deposit said contaminants on said adsorbent material. The next sequential second stage applies a continuously recirculating loop of hot regenerating gas through the adsorbent material to remove the deposited contaminants from said adsorbent material. The third continuous stage circulates a second hot regenerating gas through the bed of adsorbent material to further remove the deposited contaminants from said adsorbent material. The contaminants collected in said hot regenerating gases may be selectively condensed or readsorbed at a much higher concentration on a secondary adsorption system as explained in my U.S. Pat. No. 3,534,529 or portions thereof burned in an incinerator to supply the energy for heating the hot gases. In the fourth stage a cool regenerating gas is passed through the adsorbent material to cool the adsorbent material prior to being returned to the first stage of the process.

BRIEF DESCRIPTION OF THE DRAWINGS

FIG. 1 is a schematic diagram of the present invention showing a preferred embodiment system for removing organic contaminants from the air.

DESCRIPTION OF THE PREFERRED EMBODIMENT

FIG. 1 shows the system for removing organic vapor contaminants from the air 10 which comprises an adsorption tower 11. The adsorption tower is preferably a fluidized bed tower of the type which is well known in the fractionation or distillation industry. Adsorption tower 11 is preferably made in a cylindrical shape from plate material and has a plurality of horizontal perforated plates 13 connected and sealed at the circumference inside of the cylindrical tower 12. A segmental edge portion of the perforated plates 13 is removed and a downcomer 14 is connected at the edge thereof leaving a segmental space between adjacent or successive perforated plates 13. The last downcomer in each of the stages is longer than the downcomer in the preceding stages and connects to an imperforate separator 15 forming a plate partition between stages. The last perforated plate 16 at the bottom of the adsorption tower is connected at its segmental edge to a collecting chute 17 which conveys the adsorbent material into the bottom of the storage area 18 of the adsorbent conveyor 19. The adsorbent material is lifted and conveyed to the top of the conveyor 19 where it is returned through a feed chute 21. The means for sensing the amount of adsorbent material and maintaining a continuous fluidized bed of material is well known and is not to be explained as a part of the present invention.

Fluidized bed adsorption towers employ adsorbent materials such as activated carbon and resinous materials in spherical or granular forms. In the preferred embodiment the adsorbent material flows like a liquid over the horizontal perforated plates and down the openings opposite the down comers 14 onto the next successive perforated plate back and forth until the fluidized adsorbent material is passed into the collecting chute 17 and the storage area 18. A fluidized bed is preferred over a moving bed since it minimizes formation of stagnate areas which could reduce efficiency.

Assuming that the adsorption tower 11 is operable after having been started up, there is a large amount of vapor ladened air entering duct 22 which contains the organic contaminants to be recovered. The contaminated air is shown connected to the stage 1 portion of the adsorption tower 11. The vapor ladened air in duct 22 passes into plenum 23 which is formed by the upper separator 15 and the lower perforated plate 13 of stage 1. The pressure in plenum 23 is higher than the pressure at the outlet duct 24 containing the clean air. The clean air in duct 24 is clean enough to be returned to the process area or to be exhausted to the atmosphere in an environmentally clean state.

The downcomer 14a is made longer and deeper than the aforementioned downcomers between perforated plates. This deep downcomer 14a forms a deep bed of adsorbent material between stage 1 and stage 2 of the present system which is sufficient to form a very slight pressure seal between the stages. The adsorbent material flowing onto the preforated plates 13 of stage 2 is fluidized by the partially inert gas in duct 25 which flows into plenum 26. The hot partially inert gas in plenum 26 flows upward through successive perforated plates 13 and exits at duct 27 having stripped contaminant material from the contaminated adsorbent material entering stage 2 from stage 1 to form a first contaminant rich partially inert gas in duct 27. The contaminant rich partially inert gas in duct 27 is conducted through the heat exchanger 28 to restore the heat balance lost in heating up the adsorbent material in stage 2. The heated contaminant rich partially inert gas from heat exchanger 28 passes through duct 29 to the inlet of the second staged centrifugal blower 31. The exhaust of the second stage centrifugal blower is connected to the aforementioned inlet duct 25 which returns the contaminant rich partially inert gas to the plenum 26 of stage 2 forming a continuous loop. It will be understood that the temperature of the inert gas in the stage 2 loop substantially determines the amount of the contaminant stripped from the adsorbent material. In a preferred embodiment system designed for recovery of organic paint thinners a preferred range of temperatures in stage 2 is in the order of magnitude of 250°–300° fahrenheit. It will be understood that lower volatile material will require higher temperatures to effectively strip the contaminant from the adsorbent material.

The adsorbent material in stage 2 is passed as a deep bed along downcomer 14b into stage 3 of the contaminant recovery system. The hot inert gas in duct 32 is passed into plenum 33 so as to fluidize the adsorbent material in stage 3 before passing out of stage 3 into the duct 34 to provide a second contaminant rich partially inert gas. The duct 34 is connected to the inlet of the third stage centrifugal blower 35 and the outlet of the centrifugal blower 35 is connected to the duct 32 closing the third stage loop. As will be explained hereinafter, heat is also added to the third stage loop in order to maintain the heat loss to the adsorbent material in the adsorption tower 11. The inert gas in the third stage loop is preferably maintained between 300° and 350° fahrenheit when stripping organic paint solvents from the adsorbent material. This heat range may be varied but was selected to accomplish approximately twenty five percent stripping in the third stage and approximately seventy five percent stripping in the second stage. With the heat ranges maintained in the preferred embodiment the adsorbent material leaving the third stage alongside downcomer 14c is substantially stripped of the aforementioned organic paint solvent, but has been heated to approximately 350° fahrenheit. The inert gas in duct 36 is connected to plenum 37 where it passes through the perforated plates 13 to form the fluidized bed in stage 4. The regenerating inert gas from stage 4 is passed into duct 38 where it is conducted to the inlet of the fourth stage centrifugal blower 39. The outlet of the fourth stage centrifugal blower 39 is connected to a regeneration cooler 41 and the outlet of the regeneration cooler is connected to the aforementioned duct 36 forming the continuous closed loop for stage 4. The regeneration cooler 41 is preferably cooled with cold water to bring the temperature of the inert gas in the stage 4 loop down to approximately 100° F. It will be understood that additional heat is lost through the storage of the adsorbent material in storage area 18, conveyor 19 and feed chute 21 before being returned to the inlet of stage 1. There is additional cooling effect performed by the room temperature vapor laden contaminated air in duct 22 which is connected to the adsorption tower 11 at stage 1.

The pressure in plenum 37 of stage 4 is higher than the pressure at the outlet duct 38 of stage 4. The pressure in the plenum 33 is lower than the pressure at the outlet duct 38. Likewise, the pressure in plenum 33 is higher than the pressure at the outlet duct 34 of stage 3. Similarly, the pressure in plenum 26 is lower than the pressure in the outlet duct 34. The pressure in plenum 26 of stage 2 is higher than the pressure at the outlet duct 27 of stage 2. The pressure in plenum 23 is lower than the pressure in outlet 27. The pressure in plenum 23 of stage 1 is higher than the pressure in outlet duct 24. In the preferred embodiment there is a slight pressure differential between stages at the separators 15 and the downcomers 14. It will be understood that in the preferred embodiment there may be a slight leakage of gas from stage 4 to stage 3 and from stage 3 to stage 2 and from stage 2 to stage 1. However, the air that leaks past between stages is exhausted into outlet duct 24 as clean air. The alternative to designing a slight bleed between stages is to incur a substantial expense for pressure control valves and bypass lines as was done heretofore in the prior art between stages.

A slip stream duct 42 is connected to the inlet duct 25 which is supplied by the second stage centrifugal blower 31. Slipstream duct 42 is connected to the inlet of a condensing tower 43. The aforementioned secondary adsorption system may be employed in conjunction with condensing tower 43 to increase the solvent concentration in a conventional manner. Condensing tower 43 is of a commercially available type having a condensing coil 44 therein which condenses the contaminants from the contaminant rich partially inert gas and supplies them to a solvent recovery pump 45 which pumps the recovered solvent to a storage area not shown. Since the inert gas in duct 42 is at 250° to 300° F. and the condensing coil is preferably operating at a very low temperature, a cooling coil 46 precools the inert gas down to approximately 100° F. and the heat recovered in the cooling coil 46 is supplied to a heating coil 47 which restores the heat to the inert gas after leaving the condensing coil 44 in a manner which is well known in the prior art. The outlet of the condensing tower 43 is connected to the outlet duct 27 of the second stage loop via duct 48. In the preferred embodiment the inert gas in duct 48 contains or carries a less contaminated contaminant rich partially inert gas. The process is made more efficient by recirculating the inert gas from stage 2 back into the inlet side of centrifugal blower 31 than if a more complete condensing or stripping action had been attempted. After the gas in duct 27 and duct 48 is mixed it is passed through the heat exchanger 28. An inert gas sensor 49 is connected in the duct 29 so as to control the slipstream controller 51 which diverts incinerated inert gas back into line 29 at the inlet side of the centrifugal blower 31. It will be understood that the incinerated gas passing through controller 51 supplies some heat to the partially inert gas in stage 2 and the heat exchanger 28 may be bypassed from time to time in order to maintain the proper heat balance condensing tower 43 may comprise the aforementioned secondary adsorption system employed when required to increase the solvent concentration.

A slipstream duct 52 is connected to the inlet duct 32 at the outlet of the third stage centrifugal blower 35. A flow control sensor 53 and a control valve 54 regulate the flow of the contaminated rich partially inert gas from stage 3 to the incinerator 55. Incinerator 55 is provided with a natural gas burner 56 and a makeup air blower 57 as is well known in the art. The hot inert gas in duct 58 is passed through the heat exchanger 28 to supply any heat which may be needed to the stage 2 loop and is then connected by a duct 59 to the duct 34 and the inlet of the third stage centrifugal blower 35. It will be noted that the stage 3 loop receives the majority of the inert gas from the incinerator 55. However, the stage 3 loop is also supplying the incinerator with the combustible solvent contaminants from the third stage loop. The makeup air 57 is required to assure that the partially inert gas from duct 52 will be properly burned in the incinerator 55.

Similarly, a flow control sensor 61 in slipstream duct 42 controls the flow control valve 62 so as to maintain an optimum flow through the solvent condensing tower 43 without regard to concentration and/or temperature. Due to the variation of the concentration of the contaminants in the preferred embodiment system there is a variation in the amount of heat being released from incinerator 55. It is assumed that there is sufficient heat from the incinerator 55 in the inert gas to supply all of the heat that is necessary for stage 3 and also stage 2 inert gases. Accordingly, the temperature controllers for stage 2 and stage 3 have not been shown in detail because the optimum type of controller depends on the amount of solvent being recovered and concentrations of the solvent in the vapor laden air. However, it should be understood that temperature controllers for stage 2 and stage 3 are well known in the art and do not require elaborate explanation here. Any solvent contaminants that are not required for heating the stage 2 and stage 3 loops and supplying them with inert gas is available for being condensed in the solvent condensing tower 43. A diversionary slipstream duct 63 is connected to the supply of inert gas at duct 59 and is connected to the outlet duct 38 of stage 4 to supply the necessary inert gas balance therein. An inert gas sensing device 64 controls the control valve 65 in slipstream 63 to maintain the inert gas balance in stage 4.

It will be understood that excess inert gas could be generated in some applications. This excess inert gas would be exhausted from duct 59 following incineration so that a clean, heat reclaimed gas is discharged to the atmosphere. Controls for exhausting excess inert gas are not shown in FIG. 1 but are well known in the prior art.

There may be specific instances where stages 2 and 3 could be combined with some loss in flexibility and efficiency. Also, if different recovery fractions are highly desirable, additional stages like stage 2 may be added within the scope of this invention.

Having explained the connections of the four stages to the adsorption tower 11 it will be understood that each of the stages is controllable independently of the other stages. The optimum condition for condensing solvent is the overriding factor in the operation in stage 2. The dominant factor in the operation of stage 3 is to strip a predetermined portion of the contaminants from the adsorbent material and to maintain the proper fuel or energy input to the incinerator 55 to supply the heat for regeneration loop stages 2 and 3 and the inert gas for stages 2, 3 and 4. There is no critical or dominant factor in the stage 4 loop. It is only necessary that the regeneration cooling of the adsorbent material is sufficient to bring the adsorbent material down to a low enough temperature to be efficient for operation in the adsorption tower 11 when it enters stage 1 to assure that the adsorbent material is cool enough for the optimum amount of adsorption.

I claim:

1. A continuous process for removing low concentration organic vapor contaminants from contaminated air and for recovering a portion of said organic vapor contaminants, comprising the steps of:

passing said contaminated air through a bed of moving adsorbent material to provide contaminant bearing adsorbent material, passing a first hot partially inert regenerating gas through said contaminant bearing adsorbent material to provide a first contaminant rich partially inert gas and to provide partially contaminated contaminant bearing adsorbent material, passing a second hot partially inert regenerating gas through said partially contaminated contaminant bearing adsorbent material to provide substantially regenerated adsorbent material and a second contaminant rich partially inert gas, cooling said substantially regenerated adsorbent material to provide said adsorbent material, diverting a portion of said first contaminant rich partially inert gas through a condenser to provide a less contaminated contaminant rich partially inert gas and to recover a portion of said contaminants, returning said less contaminated contaminant rich partially inert gas to said first contaminant rich partially inert gas from which it was diverted, and mixing said partially inert gases.

2. A process as set forth in claim 1 which further includes the step of:

continuously reheating said partially inert gases.

3. A process as set forth in claim 2 wherein said step of continuously reheating said partially inert gases comprises the steps of adding newly generated hot inert gases and selectively reheating said first contaminant rich partially inert gas.

4. A process as set forth in claim 1 which further includes the step of:

passing said less contaminant rich partially inert gas through a secondary adsorbent means at said condensing tower to increase the concentration of the contaminants being recovered.

5. A process as set forth in claim 1 which further includes the step of:

heating said less contaminated contaminant rich partially inert gas before returning it to said first contaminant rich partially inert gas from which it was diverted.

6. A process as set forth in claim 1 which further includes the steps of:

diverting a portion of said second contaminant rich partially inert gas to an incinerator, incinerating said diverted portion of said second contaminant rich partially inert gas to provide burned heating gases, passing said burned heating gases through a heat exchanger, and returning the cooled heating gases to said second contaminant rich partially inert gas from which it was diverted.

7. A process as set forth in claim 6 which further includes the steps of:

reheating said second contaminant rich partially inert gas by mixing it with said returning cooled heating gases.

8. A process as set forth in claim 6 which further includes the step of:

diverting a first portion of said cooling heating gases to said first hot partially inert regenerating gas to maintain said regenerating gas partially inert.

9. A process as set forth in claim 8 which further includes the steps of:

providing a partially inert cooling gas to cool said substantially regenerated adsorbent material, and diverting a second portion of said cooled heating gases to said partially inert cooling gas to maintain said cooling gas partially inert.

10. A process as set forth in claim 1 which further includes the step of:

diverting a portion of said second contaminant rich partially inert gas through a condenser to recover a portion of the higher boiling point contaminants.

11. A process for removing organic vapor contaminants from contaminated air and for recovering a portion of said organic vapor contaminants in a continuous process having a moving fluidized bed of adsorbent material, comprising the steps of:

providing a vertical adsorption tower having gravity actuated moving adsorbent material therein, dividing said adsorption tower into a plurality of treatment stages, passing the contaminated air through a first treatment stage of said adsorption tower to provide contaminant bearing adsorbent material and to provide environmentally clean air, passing a hot partially inert regenerating gas through a second stage containing said contaminant bearing adsorbent material to provide a contaminant rich partially inert gas and to substantially regenerate said adsorbent material, diverting a portion of said contaminant rich partially inert gas through an incinerator, incinerating said diverted portion of said contaminant rich partially inert gas to provide inert burned heating gases, diverting the remaining portion of said contaminant rich partially inert gas through a condenser to provide less contaminated contaminant rich partially inert gas and to recover a portion of said contaminants, and cooling said substantially regenerated adsorbent material in the last of said plurality of stages to provide said adsorbent material for cleaning said contaminated air.

12. A process as set forth in claim 11 which further includes the steps of:

passing said inert burned heating gases through a heat exchanger to provide a cooled inert burned heating gas, and mixing a portion of said cooled inert burned heating gas with said less contaminated contaminant rich partially inert gas to provide said hot partially inert regenerating gas.

13. A process for removing organic vapor contaminants from contaminated air and for recovering a portion of said organic vapor contaminants, comprising the steps of:

providing a continuously moving recirculating bed of adsorbent material, connecting a continuously circulating loop of vapor contaminant laden gas through a first stage portion of said bed of adsorbent material to clean said gas and deposit said contaminants on said adsorbent material, connecting a first continuously recirculating loop of hot regenerating gas through a second stage portion of said bed of adsorbent material to remove said deposited contaminants from said adsorbent material, connecting a condenser in said first continuously recirculating loop of hot regenerating gas to remove a portion of said contaminants from said hot regenerating gas, connecting a second continuously recirculating loop of hot regenerating gas through a third stage portion of said bed of adsorbent material to further remove said deposited contaminants from said adsorbent material, connecting an incinerator in said second continuously recirculating loop of hot regenerating gas to burn a portion of said contaminants and to provide energy for heating said hot regenerating gases in said first and said second continuously recirculating loops, and connecting a third continuously recirculating loop of cool regenerating gas through a fourth stage portion of said bed of adsorbent material to cool said adsorbent material.

* * * * *